United States Patent [19]

Osanai et al.

[11] Patent Number: 4,649,487

[45] Date of Patent: Mar. 10, 1987

[54] METHOD AND APPARATUS FOR CONTROLLING CONTINUOUSLY VARIABLE TRANSMISSION FOR VEHICLE

[75] Inventors: Akinori Osanai; Takeshi Gono; Takao Niwa, all of Susono, Japan

[73] Assignee: Toyota Jidosha Kabushiki Kaisha, Toyota, Japan

[21] Appl. No.: 613,728

[22] Filed: May 24, 1984

[30] Foreign Application Priority Data

Jun. 6, 1983 [JP] Japan .................. 58-100486

[51] Int. Cl.⁴ .................. F16H 5/66; F16H 11/06; B60K 41/18
[52] U.S. Cl. .................. 364/424.1; 74/866; 474/12; 474/18
[58] Field of Search .................. 364/424.1; 74/866; 474/11, 12, 17, 18, 28; 123/480, 491

[56] References Cited

U.S. PATENT DOCUMENTS

| | | | |
|---|---|---|---|
| 4,385,596 | 5/1983 | Hosaka | 123/491 X |
| 4,387,608 | 6/1983 | Mohl et al. | 474/18 X |
| 4,462,275 | 7/1984 | Mohl et al. | 474/18 X |
| 4,466,521 | 8/1984 | Hattori et al. | 74/866 X |
| 4,470,117 | 9/1984 | Miki et al. | 364/421.1 |
| 4,507,986 | 4/1985 | Okamura et al. | 74/866 |
| 4,515,040 | 5/1985 | Takeuchi et al. | 74/866 |
| 4,543,077 | 9/1985 | Yamamuro et al. | 474/12 |

Primary Examiner—Felix D. Gruber
Attorney, Agent, or Firm—Oblon, Fisher, Spivak, McClelland & Maier

[57] ABSTRACT

Method and apparatus for controlling a continuously variable transmission for a vehicle for transmitting an output of an engine of the vehicle to its drive wheels, comprising a step or device for detecting an engine speed, a step or device for detecting a vehicle running speed, a step or device for sensing a vacuum pressure in an intake manifold connected to the engine, a step or device for determining an actual engine output based on the detected engine speed and the sensed intake vacuum pressure, a step or device for determining a target engine speed based on the detected vehicle running speed and the determined actual engine output, and according to a predetermined relation among the target engine speed, the vehicle running speed and the actual engine output, said relation being predetermined to attain a required output of the engine with a minimum specific fuel consumption, and further comprising a step or device for controlling the speed ratio such that the detected engine speed coincides with the target engine speed.

13 Claims, 7 Drawing Figures

METHOD AND APPARATUS FOR CONTROLLING CONTINUOUSLY VARIABLE TRANSMISSION FOR VEHICLE

BACKGROUND OF THE INVENTION

The present invention relates to a method and an apparatus for controlling a speed ratio of a continuously variable transmission for a vehicle wherein the output of an engine is transmitted to drive wheels with stepless or continuously variable speed ratios.

In the art of a continuously variable transmission for a vehicle to transmit a rotary motion of an engine to drive wheels with continuously variable ratios, it is common to change a speed ratio of the variable transmission for attaining a minimum specific fuel consumption. For this purpose, for example, a required horsepower of the engine is first obtained as a function of an amount of depression of an accelerator pedal or as a function of an angle of opening of a throttle valve. Then, a desired or target engine speed contemplated by a vehicle driver, corresponding to the operating amount of the accelerator pedal or the opening angle of the throttle valve, is determined based on a relation predetermined so as to provide the required horsepower of the engine with the minimum specific fuel consumption. The variable transmission is controlled such that an actual engine speed coincides with the determined target engine speed. Such a known method or an apparatus to practice this method is satisfactory while the vehicle is running in a relatively stable condition or at a relatively constant speed. However, in usual driving conditions wherein the accelerator pedal is frequently operated, the operating amount of the pedal or the opening angle of the throttle valve does not necessarily faithfully reflect the actual horsepower or current output of the engine. In other words, the known method or apparatus is disadvantageous in its capability of accurately establishing the target engine speed while the engine operation is in a transient state. In the same known arrangement, it is further noted that a slight variation in the opening angle of the throttle valve or in the operating amount of the accelerator pedal will cause a comparatively larger variation in the amount of supply an air-fuel mixture to the engine at relatively low engine speeds than at relatively high engine speeds, and consequently causes a comparatively larger variation in the engine output at the lower engine speeds. This fact makes it comparatively difficult to establish the target engine speed for optimal specific fuel consumption. Further, it is generally recognized that the transmission efficiency of a continuously variable transmission is reduced as its speed ratio is increased. Thus, the traditional continuously variable transmission is not completely satisfactory in its efficiency, and the target engine speed may not be determined exactly at an optimum point which must be determined with the efficiency characteristics of the variable transmission taken into consideration.

SUMMARY OF THE INVENTION

The present invention was developed in light of the above situation in the background prior art technology. It is accordingly an object of the invention to provide a method or an apparatus for controlling a speed ratio of a continuously variable transmission for a vehicle, which is improved in ease and accuacy of determination of a target engine speed even while an engine is running at a transient speed or at relatively low speeds, and which permits the transmission to be operated with an increased efficiency.

According to the invention, there is provided a method of controlling a speed ratio of a continuously variable transmission for a vehicle for transmitting a rotary motion of an engine of the vehicle to the drive wheels of the vehicle with a stepless speed change, comprising:

(1) a step of detecting a rotating speed of the engine;
(2) a step of detecting a running speed of the vehicle;
(3) a step of sensing a vacuum pressure in an intake manifold connected to the engine;
(4) a step of determining a current actual output of the engine based on the detected rotating speed thereof and the sensed vacuum pressure in the intake manifold;
(5) a step of determining a target speed of the engine based on the detected running speed of the veicle and on the determined actual output of the engine, and according to a predetermined relation among the target speed of the engine, the running speed of the vehicle and the actual output of the engine, said relation being predetermined so as to attain a required output of the engine with a minimum specific fuel consumption; and
(6) a step of controlling the speed ratio of the transmission such that the detected rotating speed of the engine coincides with the determined target speed.

In the above described method of the invention, a vacuum pressure in the intake manifold for introducing an intake gas to the engine is sensed, while at the same time a running speed of the vehicle is detected. A current actual output of the engine is determined based on the detected rotating speed of the engine and on the sensed vacuum pressure. Successively, a target speed of the engine is determined according to a predetermined relation and based on the detected running speed of the vehicle and on the determined actual output of the engine. As a result, the target engine speed may be determined so as to accurately reflect the actual running state of the engine speed even while the engine is in a transient state. A further advantage of the instant method wherein the vacuum pressure in the intake manifold is used to determine the target engine speed, resides in elimination of inaccuracy or instability of the target engine speed determination at relatively low engine speeds, as experienced in a traditional method wherein a target engine speed is determined based on an operating amount of an accelerator pedal or an opening angle of a throttle valve, this operating amount or opening angle being not accurately indicative of the actual operating condition of the engine.

Further, since the target engine speed determined according to the instant method is based also on the detected running speed of the vehicle, the target engine speed may be determined such that the speed ratio of the transmission is controlled for maximum transmission efficiency of the transmission at each specific running speed of the vehicle. It is to be understood that the term "speed ratio" of the transmission means a ratio represented by No/Ni, where Ni and No are rotating speeds of input and output shafts of the transmission, respectively.

According to the invention, there is also provided an apparatus for practicing the above stated method of the invention, which includes means for adjusting the speed ratio of the transmission such that a detected rotating speed of the engine coincides with a target speed of the engine. This apparatus of the invention comprises: (1) speed detecting means for detecting a running speed of the vehicle; (2) pressure sensing means for detecting a vacuum pressure in the intake manifold; (3) engine output determining means for determining a current actual output of the engine based on the detected rotating speed thereof and on the detected vacuum pressure in the intake manifold; and (4) target engine speed determining means for determining the target speed of the engine based on the detected running speed of the vehicle and on the determined actual output of the engine, and according to a predetermined relation among the target speed of the engine, the running speed of the vehicle and the actual output of the engine, said relation being predetermined for attaining a required output of the engine with a minimum specific fuel consumption.

In accordance with one advantageous form of the apparatus of the invention, the pressure sensing means may comprise a pressure sensor disposed in the intake manifold to sense a vacuum pressure therein. The pressure sensor may be of a Bourdon tube, bellow, diaphragm or semiconductor type which senses the intake gas pressure by utilizing a strain gauge for detecting the displacement of the tube, bellows, or diaphragm.

The controlling method and apparatus of the invention may be advantageously applied to a continuously variable transmission which comprises: an input shaft operatively connected to a vehicle engine; and output shaft operatively connected to drive wheels of the vehicle; a first and a second pulley associated with the input and output shafts, respectively, and having a variable effective diameter, a belt connecting the first and second pulleys; and a hydraulic actuator operable to change the effective diameters of the first and second pulleys. Generally the input shaft is connected to the engine through a clutch and the output shaft is connected to the drive wheels through speed-reduction gears and/or a differential gear mechanism.

In one form of the apparatus of the invention, the speed detecting means for detecting the vehicle running speed may comprise a rotation sensor operable to sense a rotating speed of the output shaft of the transmission. However, the speed detecting means is by no way limited to this rotation sensor. For example, the vehicle running speed may be detected by sensing a rotating speed of any other shaft disposed in a linkage between the output shaft of the transmission and the drive wheels, by any other suitable means.

According to another preferred form of the invention, the means for determining the actual output and target speed of the engine are constituted by a microcomputer which includes memory means for storing the previously indicated predetermined relation. The memory means of the microcomputer further stores a program which enables the actual output of the engine to be determined based on the detected rotating speed thereof and on the detected vacuum pressure in the intake manifold. The memory means further stores a program which enables the target speed of the engine to be determined according to the stored predetermined relation and based on the detected running speed of the vehicle and on the determined actual output of the engine.

BRIEF DESCRIPTION OF THE DRAWING

The above and other objects, features and advantages of the present invention will be better understood from reading the following description of the preferred embodiment taken in connection with the accompanying drawing in which.

DETAILED DESCRIPTION OF THE PREFERRED EMBODIMENT

Figure 1:
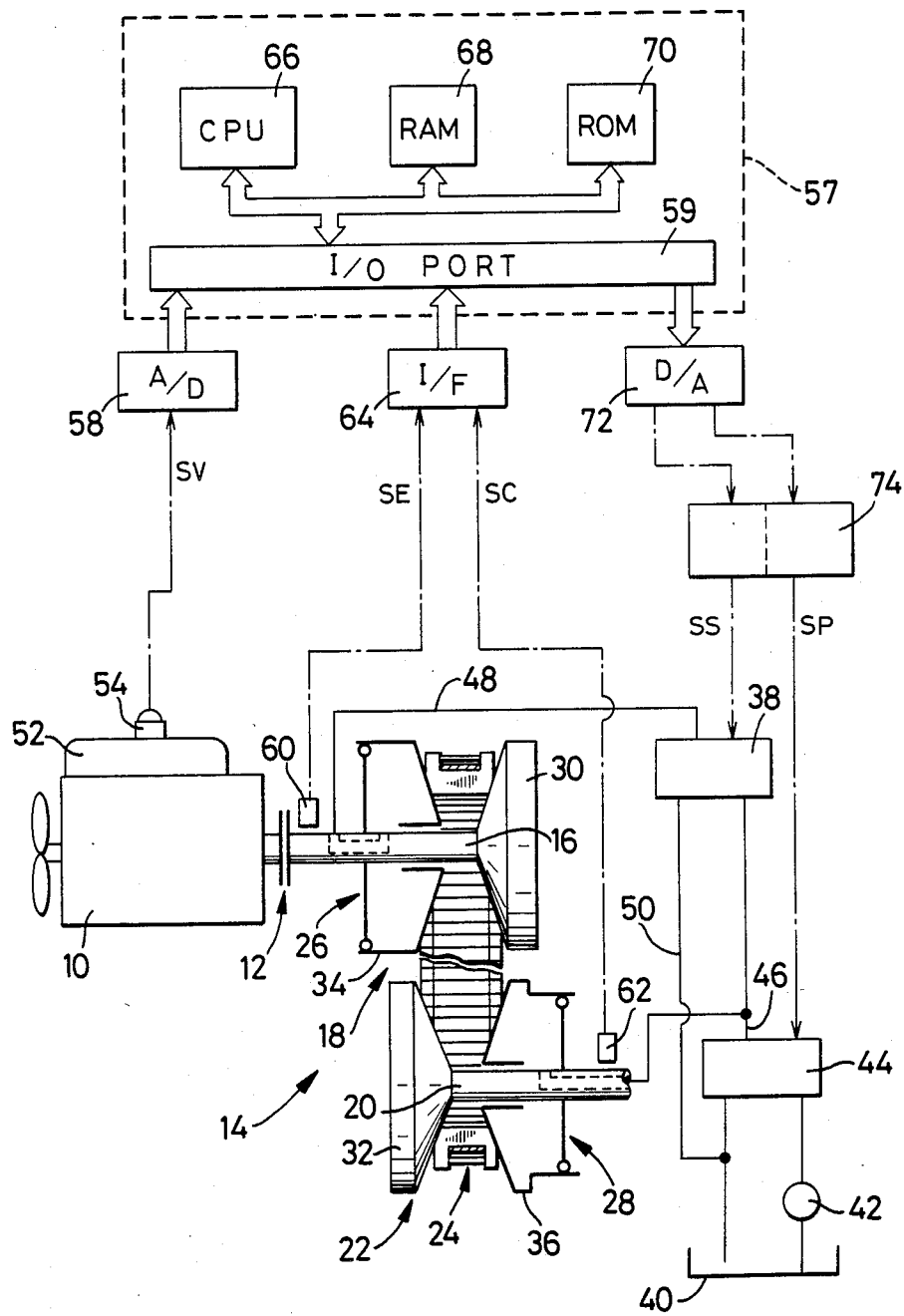
FIG. 1 is a schematic illustration of one embodiment of an apparatus of the invention for controlling a continuously variable transmission for a vehicle.

Referring to the accompanying drawing showing a preferred embodiment of the invention, there is shown in FIG. 1 a continuously variable transmission 14 (CVT 14) of belt-and-pulley type which is operatively connected to an engine 10 of a vehicle through a clutch 12 of a hydraulic, pneumatic, centrifugal, electromagnetic, or other suitable type. The variable transmission 14 serves to transmit the output of the engine 10 to drive wheels (not shown) of the vehicle such that a speed ratio of the engine 10 and the drive wheels relative to each other is steplessly variable. The variable transmission 14 comprises: a drive or input shaft 16 coupled to the clutch 12; a first variable-diameter pulley 18 having a variable effective diameter and associated with the input shaft 16; a driven or output shaft 20; a second variable-diameter pulley 22 having a variable effective diameter and associated with the output shaft 20; a transmission belt 24 connecting the first and second variable-diameter pulleys 18 and 22 and including metalblocks and a hoop; and hydraulic cylinders 26 and 28 associated with the pulleys 18 and 22, respectively, to change widths of Vee-grooves of the pulleys 18, 22 for varying their effective diameters engaging the belt 24. The first pulley 18 includes an axially stationary rotor 30 fixed to the input shaft 16, and an axially movable rotor 34 which is mounted on the input shaft 16 axially slidably relative to the rotor 30 but not rotatable relative to the shaft 16. Similarly, the second pulley 22 includes an axially stationary rotor 32 fixed to the output shaft 20, and an axially movable rotor 36 mounted on the output shaft 20 slidably relative to the rotor 32 but not rotatable relative to the shaft 20. The movable rotors 34 and 36 are slidably moved on the respective input and output shafts 16 and 20 with a hydraulic pressure applied to pressure chambers in the hydraulic cylinders 26, 28, whereby the effective diameters of the first and second pulleys 18, 22 engaging the belt 24 may be continuously varied. The hydraulic cylinder 28 is normally subject to a line pressure of a hydraulic system, while the hydraulic cylinder 26 is subject to a variable hydraulic pressure which is adjusted through a speed-ratio control valve 38 incorporated in the hydraulic system. Thus, a balance of hydraulic pressures exerted to the movable rotors 34 and 36 is changed, and consequently the speed ratio of the output shaft 20 with respect to the input shaft 16 may be varied. In this connection, it is noted that the movable rotor 34 has a larger pressure receiving area than the movable rotor 36. It is further noted that the axial positions of the stationary and movable rotors 30 and 34 of the first pulley 18 relative to each other is reversed with respect to those of the stationary and movable rotors 32 and 36 of the second pulley 22, whereby a twisting tendency of the transmission belt 24 is prevented.

The hydraulic line pressure normally applied to the hydraulic cylinder 28 is obtained from a pressure control valve 44 which adjusts a pressure of a pressurized working fluid which is pumped by a pump 42 from an oil reservoir 40. The line pressure is fed to the hydraulic cylinder 28 and to the speed-ratio control valve 38 through a conduit 46. The pressure control valve 44 comprises a linear solenoid operable in response to a PRESSURE CONTROL signal SP which will be described, and further comprises a valving member driven by the linear solenoid. The line pressure supplied from the pressure control valve 44 is regulated by changing, according to the PRESSURE CONTROL signal SP, a relief amount of the fluid which is fed back to the oil reservoir 40 to relieve a part of the fluid pressure in the pressure control valve 44. The speed-ratio control valve 38 comprises a linear solenoid operable in response to a SPEED RATIO signal SS which will be described, and further comprises a valving member driven by the linear solenoid to control amounts of the working fluid which are supplied to or discharged from the hydraulic cylinder 26. More specifically described, the speed-ratio control valve 38 is connected to the hydraulic cylinder 26 through a conduit 48, and to the oil reservoir 40 through a drain conduit 50. A movement of the valving member of the speed-ratio control valve 38 in one direction enables the conduit 46 to communicate with the conduit 48, and permits a variation in area of their communication within the valve 38, thereby adjusting an amount of the fluid to be supplied to the hydraulic cylinder 26. On the other hand, a movement of the valving member of the valve 38 in the opposite direction enables the conduit 48 to communicate with the drain conduit 50, and permits a variation in area of their communication in the valve 38, thereby adjusting an amount of the fluid to be discharged from the hydraulic cylinder 26 back to the oil reservoir 40. While the valving member of the speed-ratio control valve 38 is placed in its neutral position at which the conduit 48 is held in a substantially disconnected relation with both of the conduits 46 and 50, the amount of the pressurized fluid (hydraulic pressure) within the hydraulic cylinder 26 is held substantially constant and consequently the movable rotor 34 is located at a fixed axial position on the input shaft 16, whereby the speed ratio of the transmission 14 is held constant. When the conduit 48 is brought into communication with the conduit 46 due to the movement of the valving member of the high-ratio control valve 38, the amount of the fluid (hydraulic pressure) within the hydraulic cylinder 26 is increased and consequently the movable rotor 34 is moved away from the stationary rotor 30, with a result of increasing the effective diameter of the first pulley 18 and decreasing that of the second pulley 22, whereby the speed ratio of the transmission 14 is made higher. Conversely, when the conduit 48 is put into communication with the drain conduit 50, the movable rotor 34 is moved towards the stationary rotor 30, whereby the speed ratio is lowered.

The engine 10 is provided with an intake manifold 52 through which an intake or suction gas is supplied to the engine 10. Within this intake manifold 52, there is provided pressure sensing means in the form of a pressure sensor 54 for detecting a vacuum pressure within the intake manifold 52. The pressure sensor 54 generates a voltage signal, i.e., a VACUUM signal SV which corresponds to a vacuum pressure Po through the intake manifold 52. The VACUUM signal SV is applied to an I/O (input/output) port 59 of a microcomputer 57 through an A/D (analog/digital) converter 58.

Adjacent to the input and output shafts 16 and 20, there are respectively disposed first and second speed detecting means in the form of a first and a second rotation sensor 60, 62 for detecting a rotating speed of the input and output shafts 16, 20, respectively. The first rotation sensor 60 produces an INPUT ROTATION signal SE whose number of puless corresponds to the number of revolution of the engine 10, while the second rotation sensor 62 generates an OUTPUT ROTATION signal SC whose number of pulses corresponds to the running speed of the vehicle. These INPUT and OUTPUT ROTATION signals SE and SC are fed to an I/F circuit 64, which converts the ROTATION signals SE and SC into coded signals which represent the number of pulses per unit time of the signals SE, SC. These coded signals are applied to the I/O port 59.

The I/O port 59 is connected through a data bus line of a CPU 66 (central processing unit), a RAM 68 (random access memory), and a ROM 70 (read only memory). The CPU 66 is operated according to a program which is stored in the ROM 70 provided as one memory means, and utilizes a temporary data storage function of the RAM 68 which is provided as another memory means. The CPU 66 thus cooperates with the RAM 68 and the ROM 70, processes signals to be fed to the I/O port 59. Further, the CPU 66 feeds to a D/A (digital-/analog) converter 72 and a driver circuit 74 the SPEED RATIO signal SS representing a speed ratio e and a variation rate ė (=Δe/Δt) at which the speed ratio e is varied. The CPU 66 further feeds to the converter 72 and the driver circuit 74 the PRESSURE CONTROL signal SP representing the line pressure of the hydraulic system. The driver circuit 74, which is a power amplifier, amplifies the SPEED RATIO and PRESSURE CONTROL signals SS, SP from the D/A converter 72 and applies the amplified SPEED RATIO and PRESSURE CONTROL signals SS, SP to the linear solenoids of the speed-ratio control valve 38 and to the pressure control valve 44.

Figure 2:
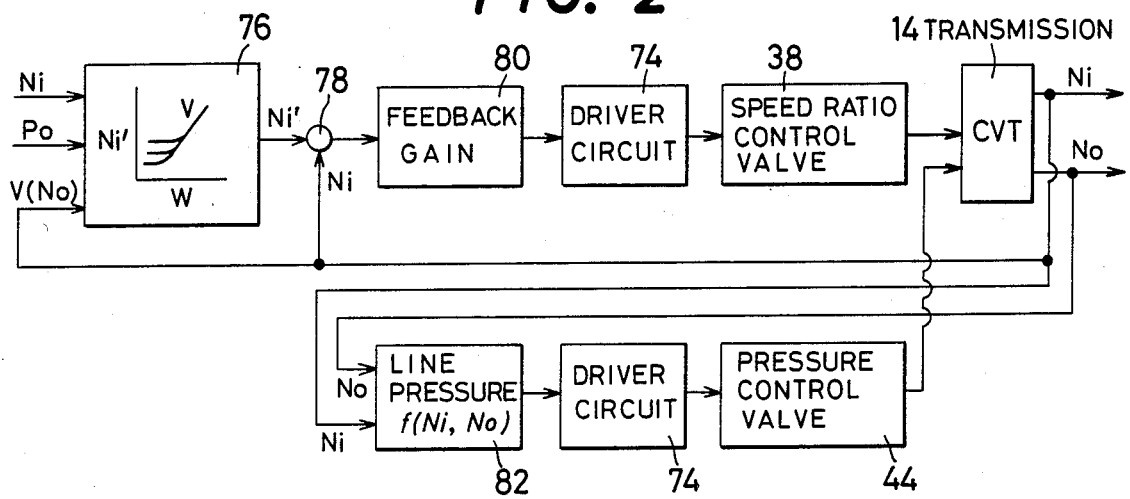
FIG. 2 is a schematic block diagram generally showing a control arrangement for the transmission of FIG. 1.
Figure 3:
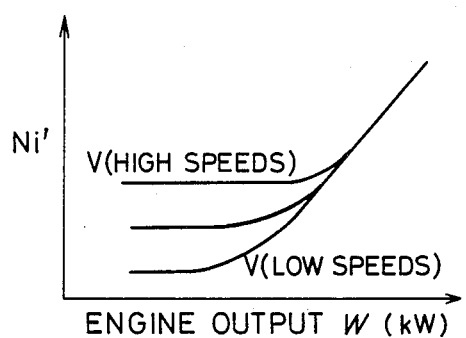
FIG. 3 is a graphical representation of a predetermined relation between an actual output of a vehicle engine and a target speed of the engine, with a running speed of the vehicle taken as a parameter.
Figure 6:
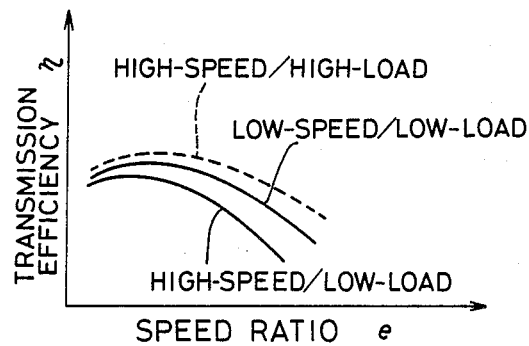
FIG. 6 is a graph showing a relation between speed ratio and transmission efficiency of the variable transmission.
Figure 4:
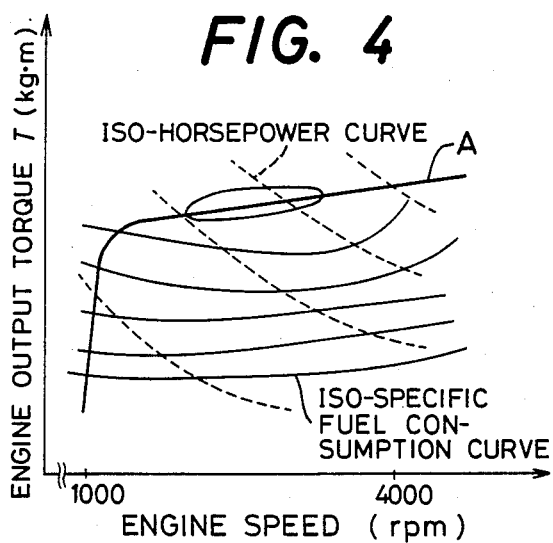
FIG. 4 is a graph representing iso-horsepower curves and iso-specific fuel consumption curves as a function of speed and output torque of the vehicle engine.
Figure 5:
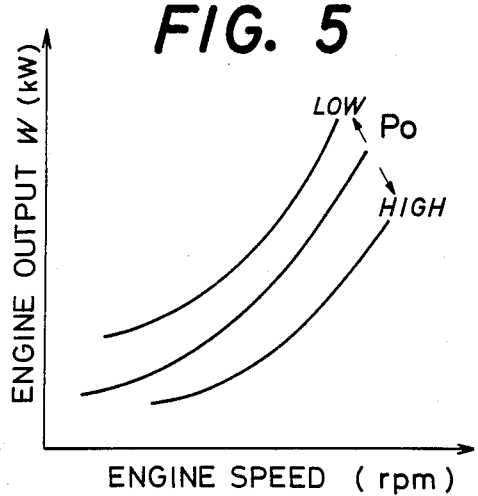
FIG. 5 is a graph showing a relation between the speed and output of the engine, with an intake vacuum pressure of the engine taken as a parameter.

FIG. 2 provides a schematic diagram generally showing a control arrangement for the variable transmission 14. Block 76 indicates a calculation or determination step by the microcomputer 57 of a current actual output W of the engine 10 based on the vacuum pressure Po represented by the VACUUM signal SV and on a rotating speed Ni of the engine 10. Block 76 further indicates a subsequent step of calculating or determining a target speed Ni' of the engine 10 (rotating speed of the input shaft 16) based on the determined actual output W of the engine 10 and on a rotating speed of No of the output shaft 20 representing a vehicle running speed V, and according to a predetermined relation represented by a graph of FIG. 3. Data representative of this relation is stored in the ROM 70. The target engine speed Ni' is determined such that the actual engine output W (required horsepower of the engine 10) may be obtained with a minimum specific fuel consumption. Stated in more detail, the engine 10, like a generally known engine, has operating characteristics as illustrated in FIG. 4 wherein solid lines show iso-specific fuel consumption curves (g/PS·h), and broken lines show iso-horsepower curves (PS). A curve "A" is defined by points at which the specific fuel consumption is minimum at each level of the output horsepower of the engine 10. Thus, it is desired that the engine speed be selected along the curve "A". Since the actual output W of the engine 10 is varied as a function of an acutal rotating speed Ni of the engine 10 and the intake vacuum pressure Po as shown in FIG. 5, the target engine speed Ni' for operating the engine 10 along the curve "A" is obtained as a function of the actual output W of the engine 10 which is determined by the intake vacuum pressure Po and the detcted rotating speed Ni, whereby the relation [W=f (Ni, Po)] shown in FIG. 3 may be predetermined, for example. In the graph of FIG. 3, the vehicle running speed V is further used as a parameter in relation to the actual output W of the engine 10 and the target engine speed Ni'. The data representative of the relation shown in FIG. 3 is determined such that the target engine speed Ni' is increased as the vehicle running speed V is elevated where the actual engine output W is held in a range up to an intermediate lever thereof. This design to increase the target engine speed Ni' with the vehicle running speed V, is intended to reduce the speed ratio e of the transmission 14 as the vehicle running speed V is elevated, so that the transmission efficiency of the transmission 14 may be held in a relatively high range, in view of generally known operating characteristics of a transmission as shown in FIG. 6, which indicate that the transmission efficiency is increased as the speed ratio e is reduced. In other words, the data in the ROM 70 is determined with the transmission efficiency characteristics also taken into account.

The target engine speed Ni' calculated as indicated at 76 in FIG. 2 is compared by a comparator 78 with an actual or detected engine speed Ni, in order to obtain an error E. Then, the microcomputer 57 calculates the speed ratio $\dot{e}$ and its variation rate $\dot{e}$ so as to zero the error E. Signals indicative of these speed ratio e and the variation rate $\dot{e}$ are fed to the speed-ratio control valve 38 through a feedback gain 80 and the driver circuit 74. As a result, the speed-ratio control valve 38 is operated to change the amount (pressure) of the working fluid in the hydraulic cylinder 26 and accordingly vary the speed ratio e of the transmission 14, whereby the actual or detected engine speed Ni is made equal to the desired or target engine speed Ni'.

In the meantime, the microcomputer 57 calculates an optimum line pressure LP of the conduit 46 based on the detected engine speed Ni and on the detected rotating speed No corresponding to the vehicle running speed V, as indicated at 82 in FIG. 2. A signal representing the calculated line pressure LP is applied to the pressure control valve 44 through the driver circuit 74. As a result, the line pressure LP is maintained at a minimum level necessary to prevent a torque transmission loss due to slip of the belt 24 on the pulleys 18, 22, whereby otherwise possible power loss and shortened service life of the belt 24 due to excessive tension of the belt may be avoided.

Figure 7:
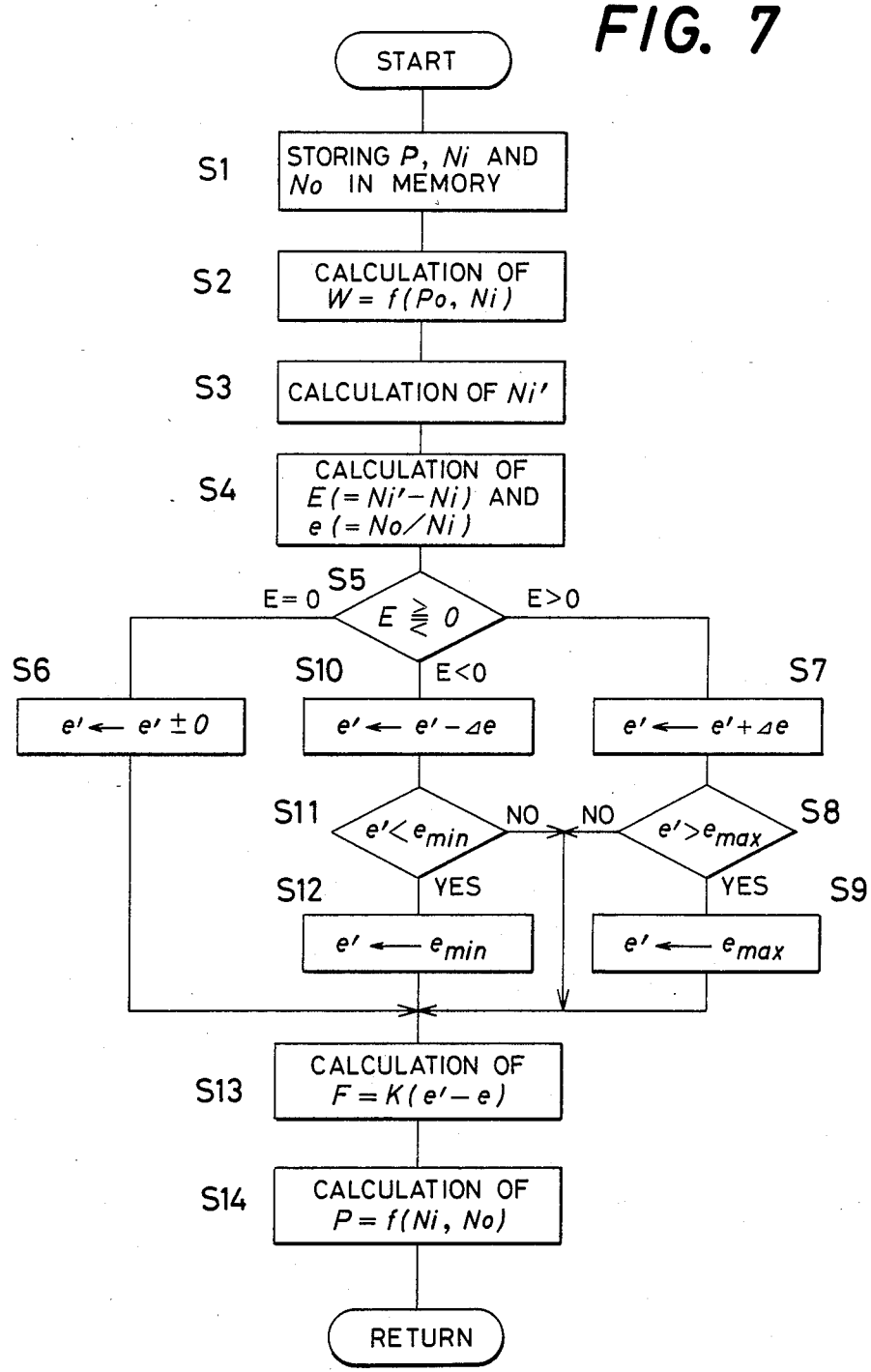
FIG. 7 is a flow chart illustrating the operation of the embodiment of FIG. 1.

Referring next to a flow chart of FIG. 7, the operation of the present embodiment of the invention will be described.

At first, step S1 is executed to store in the RAM 68 the following data according to the VACUUM, INPUT ROTATION and OUTPUT ROTATION signals SV, SE and SC: data on the vacuum pressure Po in the intake manifold 52; data on the detected rotating speed Ni of the engine 10; and data on the rotating speed No corresponding to the actual vehicle running speed V. Step S1 is followed by step S2 corresponding to engine output determination, wherein the actual output W of the engine 10 is calculated based on the detected vacuum pressure Po and the rotating speed Ni of the engine 10, and according to a relation shown in FIG. 5. Step S2 is followed by step S3 wherein the target engine speed Ni' is calculated by target engine speed determining means (indicated at 76 in FIG. 2) within the microcomputer 57, based on the calculated actual output W of the engine 10 and on the rotating speed No of the output shaft 20 indicative of the vehicle running speed V, and according to predetermined data stored in the ROM 70, i.e., according to a predetermined relation shown in FIG. 3. Then, step S4 is performed to calculate the actual speed ratio e (=No/Ni) and the error E (=Ni'−Ni). When the error E has been obtained, a value Δe used in subsequent steps S7 and S10 is set as a function of the error E.

In step S5, the microcomputer 57 judges whether the error E is positive or negative, or zero. When the error E is zero, step S5 is followed by a step S6 wherein a target speed ratio e' is maintained. It is noted here that the actual speed ratio e is initially used as the target speed ratio e'. When the error E is found to be negative in step S5, step S7 is executed wherein the preset small value Δe (preset upon completion of step S4 as previously indicated) is added to the error E. Then, the target speed ratio e' is checked in the following step S8 as to whether the value e' is greater than a maximum value $e_{max}$. If the value e' is not greater than the maximum value $e_{max}$, step S8 is followed by step S13 which will be described. If the value e' is greater than the maximum value $e_{max}$, step S8 is followed by step S9 wherein the target speed ratio e' is fixed at the maximum value $e_{max}$. Then, the control goes to step S13. Referring back to step S5, when the error E is found to be negative, step S10 is taken wherein the preset small value Δe is subtracted from the error E, and step S10 is followed by step S1 wherein the target speed ratio value e' is checked to see whether it is smaller than a minimum value $e_{min}$. If this checking reveals that the value e' is not smaller than the minimum value $e_{min}$, step S13 is executed next. If the value e' is smaller than the minimum value $e_{min}$, step S11 is followed by step S12 wherein the value e' is fixed at the minimum value $e_{min}$, and then followed by step S13.

When the target speed ratio e' has been determined as described above, step S13 is executed to calculate a difference between the target speed ratio e' and the actual speed ratio e, and obtain a feedback gain F by multiplying the calculated difference by a constant K. The amount (pressure) of the hydraulic working fluid in the hydraulic cylinder 26 is changed at a rate corresponding to the obtained feedback gain F, and the actual speed ratio e is varied towards the target speed ratio e' at the variation rate $\dot{e}$ corresponding to the value of the error E. That is, when the error E or difference between the actual and target speed ratios e and e' is zero, the feedback gain F is zero and therefore the valving member of the speed-ratio control valve 38 is located substantially at its neutral position at which the conduit 48 is not in communication with the conduit 46 or 50. Hence, the amount of pressure of the working fluid in the hydraulic cylinder 26 is kept constant and consequently the speed ratio e is held unchanged. However, if the target speed ratio e' is greater than the actual speed ratio e, the speed-ratio control valve 38 is operated so that the amount of the working fluid in the hydraulic cylinder 26 is increased and the movable rotor 34 is moved away from the stationary rotor 30 whereby the speed ratio e is increased. On the contrary, if the target speed ratio e' is smaller than the actual speed ratio e, the speed-ratio control valve 38 is operated to move the movable rotor 34 towards the staionary rotor 30 and decrease the speed ratio e. With the above described series of steps executed at a high speed, the speed ratio e is continuously adjusted such that the error E between the actual speed ratio e and the target speed ratio e' is zeroed. Thus, the engine speed may be controlled for minimum fuel consumption and maximum transmission efficiency.

Step S13 is followed by step S14 wherein a pressure control amount P for adjusting the line pressure LP is calculated according to a predetermined functional equation $P = f(N_i, N_o)$ stored in the ROM 70 and based on the data $N_i$ and $N_o$ stored in the RAM 68 in step S1. This pressure control amount P is so determined that the line pressure LP is held minimum but greater than a level at which the belt 24 begins to slip on the pulleys 18, 22. The obtained pressure control amount P is given, in the form of the PRESSURE CONTROL singnal SP, to the pressure control valve 44 which regulates the line pressure LP at an optimal level according to the signal SP.

As described hitherto in connection with the preferred form of the invention, the actual output of the engine 10 is determined based on the vacuum pressure Po and the rotating speed $N_i$ and according to the relation shown in FIG. 5, and then the target engine speed $N_i'$ is obtained according to the predetermined relation (as shown in FIG. 3) and based on the determined actual output W of the engine 10 and on the vehicle running speed V. The obtained target engine speed $N_i'$ is utilized to adjust the speed ratio e of the continuously variable transmission 14 such that the actually detected engine speed $N_i$ coincides with the target engine speed $N_i'$. In this arrangement, the obtained target engine speed $N_i'$ is more responsive or faithful to a required output horsepower (required laod) of the engine 10, than in the known arrangement wherein the target engine speed $N_i'$ is determined based on an opening angle of a throttle valve or on an operating amount of an accelerator pedal. Stated differently, an acclerator pedal movement or a throttle valve opening angle will relatively accurately correspond to the actual output of an engine while the engine is running at a relatively fixed speed, but will not necessarily reflect the actual engine output according to the known response characteristics while the engine is in a transient running state.

The determination of the target engine speed $N_i'$ based on an intake vacuum pressure according to the invention is advantageous over the known method of determination based on an operating amount of the accelerator pedal or throttle valve. In this known method, only a slight amount of operation of the pedal or valve will cause a comparatively large variation in the amount of flow of the intake gas through the intake manifold, i.e., large variation in vacuum pressure in the manifold. In the preceding embodiment of the invention, however, the intake vacuum pressure itself is detected as a basis to determine the actual engine output W which is a basis to determine the target engine speed $N_i'$, and consequently the determination of the target engine speed is comparatively easy and reliable even while the engine speed is relatively low.

The illustrated embodiment of the invention is further advantageous because of the arrangement wherein the target engine speed $N_i'$ is elevated as the vehicle running speed V is increased, i.e., the speed ratio e of the transmission 14 is lowered as the vehicle running speed V is increased. This means a higher operating efficiency of the transmission and a higher driving efficiency of a vehicle because the transmission efficiency is higher when the transmission is operated at a lower speed ratio than at a higher speed ratio, as shown in FIG. 6.

Although the present invention has been described in connection with the continuously variable transmission 14 of belt-and-pulley type, the invention is applicable to other types of continuously variable transmissions.

It is appreciated that data representative of a functional equation $N_i' = f(P_o, N_i, V)$ be stored in the memory means of the microcomputer 57 to determine a target engine speed $N_i'$ directly from an intake vacuum pressure Po, detected engine speed $N_i$ and vehicle running speed V. In essence, the principle of the invention may be practiced, provided data substantially representing an actual output W of the engine 10 is obtained before a target engine speed $N_i'$ is determined from that actual engine output W and a detected vehicle running speed V.

While the present invention has been described in its preferred embodiment, it is to be understood that the invention is not limited thereto; but various changes and modifications may be made without departing from the scope of the invention defined in the appended claims.

What is claimed is:

1. A method of controlling a speed ratio of a continuously variable transmission for a vehicle for transmitting a rotary motion of an engine of the vehicle to drive wheels of the vehicle with a stepless speed change, comprising:

a step of detecting a rotating speed of said engine;

a step of detecting a running speed of said vehicle;

a step of sensing a vacuum pressure in an intake manifold connected to said engine;

a step of determining a current actual output of said engine based on the detected rotating speed thereof and the sensed vacuum pressure in said intake manifold;

a step of determining a target speed of said engine based on the detected running speed of the vehicle and on the determined actual output of the engine, and according to a predetermined relation among said target speed of the engine, said running speed and said actual output of the engine, said relation being predetermined so as to increase said target speed of the engine with the detected running speed of the vehicle and to attain a required output of said engine with a minimum specific fuel consumption; and a step of controlling said speed ratio of the transmission such that said detected rotating speed of the engine coincides with said target speed thereof.

2. A vehicle having a continuously variable transmission wherein the engine of said vehicle is provided with an intake gas through an intakes manifold connected to the engine, said speed ratio of said continuously variable transmission being controlled by an apparatus comprising:

first speed detecting means for detecting a rotating speed of said engine;

second speed detecting means for detecting a running speed of said vehicle;

pressure sensing means for detecting a vacuum pressure in said intake manifold;

engine output determining means for determining a current actual output of said engine based on the detected rotating speed thereof and on the detected vacuum pressure in said intake manifold;

target engine speed determining means for determining a target speed of the vehicle and on the determined actual output of the engine, and according to a predetermined relation among said target speed, said running speed and said actual output, said relation being predetermined for increasing said target speed of the engine with the detected running speed of the vehicle and for attaining a required output of said engine with a minimum specific fuel consumption; and means for controlling said speed ratio of the transmission such that the detected actual speed of the engine coincides with the determined target speed of the engine.

3. An apparatus as set forth in claim 2, wherein said transmission includes:

an input shaft operatively connected to said engine;
an output shaft;
a first pulley associated with said input shaft and having a variable effective diameter;
a second pulley associated with said output shaft and having a variable effective diameter;
a belt connecting said first and second pulleys; and
a hydraulic actuator operable to change the effective diameters of said first and second pulleys.

4. An apparatus as set forth in claim 2, wherein said pressure sensing means comprises a pressure sensor disposed in said intake manifold.

5. An apparatus as set forth in claim 3, wherein said second speed detecting means comprises a rotation sensor for sensing a rotating speed of said output shaft of the transmission.

6. An apparatus for controlling a speed ratio of a continuously variable transmission for a vehicle wherein an engine is provided with an intake gas through an intake manifold connected to the engine, said transmission having an input shaft operatively connected to said engine and an output shaft operatatively connected to drive wheels of the vehicle, said apparatus comprising:

pressure sensor disposed in said intake manifold;
a first rotation sensor operable to sense a rotating speed of said input shaft, for detecting a rotating speed of said engine;
a second rotation sensor operable to sense a rotating speed of said output shaft, for detecting a running speed of the vehicle; and
a microcomputer including engine output determining means for determining a current actual output of said engine based on the detected rotating speed thereof and on the detected vacuum pressure in said intake manifold, said microcomputer further including memory means for storing a pedetermined relation among said target speed of the engine, said running speed of the vehicle and said actual output of the engine, said relation being predetermined for increasing said target speed of the engine with the detected running speed of the vehicle and for attaining required output of the engine with a minimum specific fuel consumption, said microcomputer further including means for determining said target speed of the engine according to the stored predetermined relation, and based on the detected running speed and the determined actual output of the enine, and means for controlling said speed ratio of the transmission such that the detected actual speed of the engine coincides with the detected target speed of the engine.

7. A method of controlling on a vehicle having a continuously variable transmission wherein said continuously variable transmission includes an input shaft operatively connected to an engine of the vehicle and an output shaft operatively connected to drive wheels of the vehicle, and which is adapted to transmit an output of the engine to the drive wheels with a continuously variable speed ratio of the output shaft with respect to the input shaft, comprising the steps of:

detecting a rotating speed of said engine;
detecting a running speed of said vehicle;
sensing a vacuum pressure in an inake manifold connected to said engine;
determining a current actual output of said engine based on the detected rotating speed thereof and on the detected vacuum pressure in said intake manifold; and
determining a target engine speed based on the detected running speed of the vehicle and on the determined actual output of the engine, and according to a predetermined relation among said target speed of the engine, said running speed of the vehicle and said actual output of the engine, said relation being predetermined for increasing said target speed of the engine with the detected running speed of the vehicle and for attaining a required output of said engine with a minimum specific fuel consumption; and
controlling said speed ratio such that said detected rotating speed of the engine coincides with said target speed thereof.

8. A method as set forth in claim 7, wherein said running speed of the vehicle is detected by sensing a rotating speed of said output shaft.

9. A method as set forth in claim 7, wherein said rotating speed of the engine is detected by sensing a rotating speed of said input shaft.

10. A method as set forth in claim 7, wherein the steps of determining said actual output and said target speed of the engine and controlling said speed ratio are effected by a microcomputer.

11. A method as set forth in claim 10, wherein said detected running speed of the vehicle and said vacuum pressure in the intake manifold are stored in first memory means, and said predetermined relation is stored in second memory means.

12. A method as set forth in claim 7, wherein said intake manifold is provided with a pressure sensor disposed therein.

13. A method as set forth in claim 7, wherein said transmission comprises a first variable-diameter pulley associated with said input shaft, a second variable-diameter pulley associated with said output shaft, and a belt connecting said first and second variable-diameter pulleys, the step of controlling said speed ratio being effected by changing effective diameters of said pulleys engaging said belt.

* * * * *